UNITED STATES PATENT OFFICE.

WILLIAM RUMEL, OF SALT LAKE CITY, UTAH, ASSIGNOR TO THE RUMEL PATENTS CORPORATION, A CORPORATION OF UTAH.

INSULATING COMPOSITION.

1,000,295. Specification of Letters Patent. Patented Aug. 8, 1911.

No Drawing. Application filed September 28, 1910. Serial No. 584,346.

*To all whom it may concern:*

Be it known that I, WILLIAM RUMEL, a citizen of the United States, and a resident of Salt Lake City, in the county of Salt Lake and State of Utah, have invented a new and Improved Insulating Composition, of which the following is a full, clear, and exact description.

The invention is an improved insulation for boilers, steam pipes, refrigerator pipes and appliances, and such other apparatus to which a non-conductor of heat is to be applied.

The invention has in view an insulating material which is relatively cheaper than asbestos, and which will offer a more effective barrier to radiation between two mediums of different temperatures, although I do not claim the composition to withstand the ravages of fire.

In carrying out my invention I use lime, sawdust and hair, the lime being preferably in the form of lime putty, the resultant of slaked lime.

In preparing the composition, the lime is first slaked; then the liquid called "lime putty" is drawn off, and into the lime putty is mixed the sawdust and hair, preferably in the following proportions: 65% lime putty, 30% sawdust, 5% cow hair, or common plastering hair. This composition when once mixed can be allowed to dry, and re-moistened when wanted for use.

The composition is applied in a moistened state and when the pipe or boiler in question is hot, for the reason that the pipe and boiler are then expanded, whereas if applied with the pipe or boiler cold, the expansion of the same when heated would cause the insulation to crack. The composition can also be molded in forms, with an outer coating of canvas, and applied when dry.

Having thus described my invention, I claim as new and desire to secure by Letters Patent:

An insulating material consisting of a mixture of 65% lime putty, 30% sawdust and 5% plastering hair.

In testimony whereof I have signed my name to this specification in the presence of two subscribing witnesses.

WILLIAM RUMEL.

Witnesses:
 FRANK RUMEL,
 ARTHUR L. GENERAUX.

Copies of this patent may be obtained for five cents each, by addressing the "Commissioner of Patents, Washington, D. C."